United States Patent [19]

Blew

[11] Patent Number: 4,983,333

[45] Date of Patent: Jan. 8, 1991

[54] METHOD FOR CONTROLLING EXCESS FIBER LENGTH IN A LOOSE TUBE OPTICAL FIBER BUFFER TUBE

[75] Inventor: Douglas J. Blew, Hickory, N.C.

[73] Assignee: Siecor Corporation, Hickory, N.C.

[21] Appl. No.: 476,808

[22] Filed: Jan. 29, 1990

Related U.S. Application Data

[62] Division of Ser. No. 310,961, Feb. 16, 1989, Pat. No. 4,921,413.

[51] Int. Cl.$^5$ .................. B29D 11/00; B29C 47/78
[52] U.S. Cl. .................. 264/1.5; 264/173; 264/209.1; 264/348
[58] Field of Search ............ 264/1.5, 237, 348, 173, 264/209.1; 425/71

[56] References Cited

U.S. PATENT DOCUMENTS

| | | | |
|---|---|---|---|
| 2,027,419 | 1/1936 | Dreyfus | 425/71 |
| 3,538,210 | 11/1970 | Gatto | 425/71 |
| 3,668,288 | 6/1972 | Takahashi | 264/237 |
| 4,029,450 | 6/1977 | Caser | 425/71 |
| 4,154,783 | 5/1979 | Jackson | 264/1.5 |
| 4,247,271 | 1/1981 | Yonekura et al. | 425/71 |
| 4,247,506 | 1/1981 | Summers | 264/178 R |
| 4,356,143 | 10/1982 | Hill et al. | 264/557 |
| 4,575,326 | 3/1986 | French | 425/71 |
| 4,728,470 | 3/1988 | Einsle et al. | 425/71 |
| 4,863,541 | 9/1989 | Katz et al. | 264/565 |

FOREIGN PATENT DOCUMENTS

| | | | |
|---|---|---|---|
| 276385 | 12/1985 | U.S.S.R. | 425/71 |
| 1204057 | 9/1970 | United Kingdom | 264/348 |

Primary Examiner—James Lowe
Attorney, Agent, or Firm—Roy B. Moffitt

[57] ABSTRACT

A method for controlling excess fiber length (EFL) in a loose tube optical fiber buffer tube which includes traversing a just extruded plastic buffer tube, containing optical fibers and a filling compound, through a vertical cooling tower along a buffer tube path of travel in the cooling tower where the cooling tower contains a water blocking device disposed at a predetermined point along the buffer tube path of travel and the water blocking device has a body containing (a) a chamber with inlet and outlet ports, defining a buffer tube path of travel aligned with the cooling tower path of travel, a conical shaped portion circumscribing a part of the buffer tube path of travel and an annulus shaped portion circumscribing the buffer tube path of travel and a portion of the conical shaped portion; (b) a device disposed near the outlet port for providing a stream of gas directed at the buffer tube path of travel; and, (c) a drain port to remove accumulated water from the annulus-shaped portion. The loose tube optical fiber buffer tube is at a predetermined elevated temperature upon emerging from the water blocking device and without EFL. Subsequently, the fiber is coupled to the loose tube interior and then cooled to ambient temperature to form EFL.

9 Claims, 4 Drawing Sheets

METHOD FOR CONTROLLING EXCESS FIBER LENGTH IN A LOOSE TUBE OPTICAL FIBER BUFFER TUBE

This application is a divisional application from U.S. patent application Ser. No. 07/310,961, filed Feb. 16, 1989, entitled "Method and Apparatus for Controlling Excess Fiber Length in a Loose Tube Optical Fiber Buffer Tube", now U.S. Pat. No. 4,921,413.

BACKGROUND OF THE INVENTION

This invention deals with a problem encountered in the manufacture of loose tube fiber optic cable. More particularly, it involves the problem of excess fiber length (EFL) control during the manufacture of the loose tube for optical fibers. EFL (expressed as a percentage) is the length of optical fiber in a loose buffer tube, less the length of the buffer tube, divided by the length of the buffer tube times 100. Excess fiber lies loosely coiled in the buffer tube; however, when the buffer tube itself is stretched, either by thermally induced expansion forces or by mechanical means, the excess fiber permits such buffer tube stretching without putting any tensile forces on the fibers themselves. Excessive EFL is undesirable because of bending restrictions on the fiber over the temperature range at which a cable, made in part from the buffer tubes, encounters in operation.

The prior art manufacture of loose tube buffered optical fibers involves the following steps performed essentially simultaneously: (a) applying a filling compound to one or more optical fibers; and (b) extruding around the filling compound and optical fibers a plastic buffering tube of a diameter that permits the optical fibers to be loosely disposed in the buffer tube to the extent that the fiber(s) can move about within the confines of the buffer tube's interior. Subsequently, the fiber is coupled to the interior of the buffer tube and then cooled where the EFL is achieved. In some fiber optic cable containing loose buffer tubes, zero percent (0%) EFL is desired. In others, anywhere from 0.1 to 0.7 percent EFL is required, depending on the cable design. This invention is directed towards controlling the EFL of optical fibers in a loose buffer tube by controlling the cooling of the buffer tube as it is cooled from its just-extruded to a predetermined elevated temperature. The tube is solidified to the extent that it can be traversed about a rotatable member, where coupling takes place. Thereafter, cooling to ambient temperatures results in the EFL.

In practice, positive EFL's are accomplished by variations in cooling water temperature using certain prior art machinery employed to manufacture loose tube fiber optic cable. The water quench point and dwell time of the tube in the water and/or or wrap around sheaves are some of the variables used. The mechanics behind these particular variations involve having a controlled and elevated tube temperature at the point where the optical fibers become coupled to the interior of the buffer tubes. Such coupling is either a mechanical fixation of the fibers to the interior wall of the tube, arising out of the filling compound itself or actual contact and mechanical fixing of the fiber to the interior of the buffer tube without the aid of the filling compound. It may also occur as a result of a combination of these events. In any event, a coupling is where the tube and the fiber travel at the same speed, one is coupled with the other. One prior art method of achieving fiber coupling is to wrap the tube with fiber in it around a sheave. Thermoshrinkage from the elevated temperature to ambient temperature after the fibers have been coupled yields the excess fiber length within the tube.

There are two types of extrusion techniques used in present prior art optical fiber buffer tube manufacture, horizontal and vertical. The vertical type is the preferred. Controlled cooling in a vertical extrusion process is quite difficult because cooling water flow and the buffer tube are moving in the same direction. Breaking contact between cooling water and a cooling buffer tube in a vertical extrusion process cannot be achieved simply by an out flow at the end of a trough, as is the case in horizontal extrusion. When horizontal extrusion is used, water can simply flow out the ends of a horizontal trough and downward off the tube. Thus, there arose a need for controlled water cooling of a fiber optic loose buffer tube using a vertical cooling apparatus. This need required control over the exact point where the water contacted the tube and cooling began in combination with an exact point where water cooling of the tube stopped. The amount of cooling required also needed to be variable in order to achieve corresponding subsequent variations in EFL. Toward this end, EFL's of 0.006% to 0.6976% have been achieved by this invention.

BRIEF DESCRIPTION OF THE INVENTION

The invention is primarily a water blocking device in a cooling tower. The cooling tower is basically an elongated tubular member (either round or rectangular in cross sections) containing a plurality of baffles (cross members) disposed transverse to the longitudinal axis of the tubular member. Each of the baffles has at least one aperture in its center and is spaced apart from other baffles, delimiting a space between them. Each aperture of each baffle is aligned with one another so as to delimit a buffer tube path of travel through the cooling tower. The cooling tower has a water inlet at the top of the tower into which water is forced. A water chilling and recirculating unit is used to recirculate and chill the cooling water to keep it at a constant temperature. Water is allowed to travel downwardly from one baffle to the other through the various apertures until it reaches the bottom of the cooling tower where it is forced to flow through and is thereafter drained out of a water blocking device, through which the buffer tube also passes. In the present invention, however, the baffles of the cooling tower are removable and the bottom of the cooling tower is controlled by a water block. A water blocking device is a device adapted to be received in the cooling tower and has (a) an internal chamber; (b) a plurality of elastomeric members disposed in its outer surfaces; (c) inlet and outlet ports aligned with the apertures in the baffles of the cooling tower, (d) a means (streams of air or gas) of removing cooling water from the tube; and, (e) a means of draining such water away. The elastomeric members basically are "O" rings.

A water block device received in the cooling tower, disposed usually near the bottom, serves to block off the further downward movement of the water as it comes in from the cooling tower from its upper reaches. By moving the water block device upwardly or downwardly, the amount of buffer tube cooling—the amount of cooling water coming into contact with a cooling buffer tube—can be governed and thus the EFL, which is formed subsequently in the process. As the water block device is moved upwardly, the EFL increases because the heat transferred from the just-formed (extruded) buffer tube is reduced. As the water block device is lowered, the less the EFL because the increased cooling of the just-formed buffer tube, it has shrunk more. Coupling to form EFL takes place subsequent to the buffer tube emerging from cooling tower, more specifically, it takes place on a sheave (a rotatable member) upon which the loose tube buffer optical fibers are subsequently traversed. EFL takes place in a subsequent cooling step, also using rotatable members.

A fiber optic loose buffering tube is formed and the thus-formed buffer tube is threaded into a cooling tower through apertures in the baffles of the cooling tower and into and out of inlet and outlet ports of a water block device. The water blocking device has a body containing a chamber and communicating inlet and outlet ports aligned with the apertures of the baffles delimiting a buffer tube path of travel over and through which a previously formed and not yet solidified plastic buffer tube is passed. The body of such a device also has a plurality of holes surrounding the buffer tube path of travel disposed just out by the outlet port of the chamber, into which gas under pressure is pumped. This gas impinges upon the cooling buffer tube and drives the water contained on the surface of the buffer tube off of the buffer tube back into the chamber. The chamber of the body of the water block device includes a conical-shaped portion, the lower portion of which is spaced apart from the outlet port of the water block device and circumscribes the buffer tube path of travel, and an annulus shaped portion circumscribing the conical-like portion. Water that remains on the cooling buffer tube, as the result of having been passed through the cooling tower, is forced, by gas impinging on it, into the upper reaches of chamber and thence into the annulus where it is held momentarily. Thereafter, the water is removed from the annulus part of the chamber by drainage through a drainage port.

DETAILED DESCRIPTION OF THE INVENTION

Figure 1:
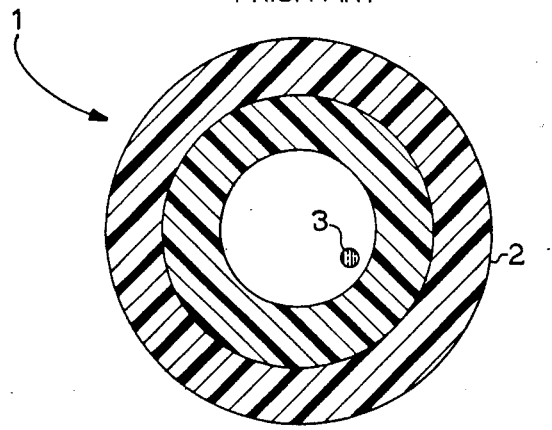
FIG. 1 is a cross-sectional view of a prior art buffer tube containing an optical fiber.
Figure 2:
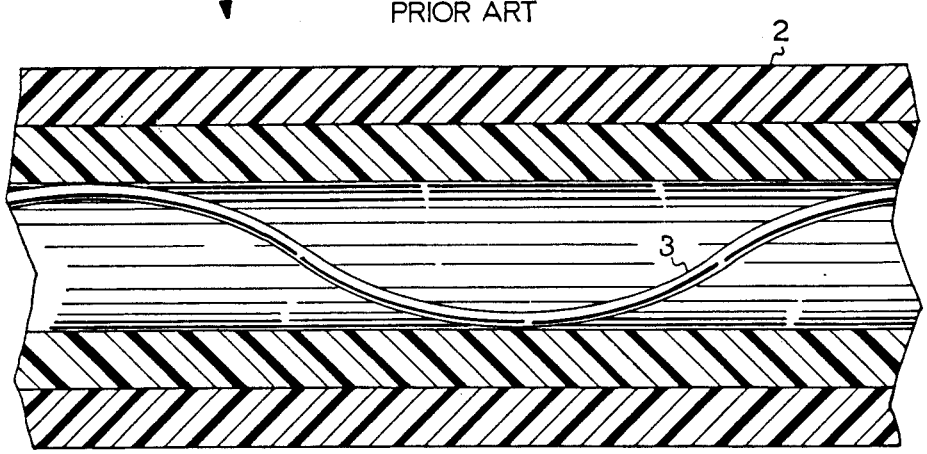
FIG. 2 is another cross-sectional view of the buffer tube and optical fiber of FIG. 1 showing excess fiber length (EFL).

The invention is a modification of a vertical buffering line manufactured by Siemens, A.G. of Munich, West Germany, more particularly, a modification of the vertical cooling tower and subsequent cooling systems of such a prior art apparatus. Such apparatus, shown in FIG. 3, produces optical fiber loose tube buffer and filling compound combinations, like that shown in FIGS. 1 and 2 by element 1 and EFL's in the range of 0.006% to 0.6976%. Element 2 identifies the sidewall of the buffer tube and element 3 denotes the optical fiber with EFL loosely disposed inside of buffer tube 2. Buffer tube wall 2 is shown made of two layers; however, only one layer may be used if desired. The inner layer may be made of nylon (or a suitable polycarbonate) and the outer layer from a suitable polyester. It will be noted that if fiber 3 of FIG. 2 were stretched out in a more or less straight line and its length compared with the length of buffer tube 2, the length of the fiber 3 would exceed that of buffer tube 2, thus excess fiber length.

Figure 3:
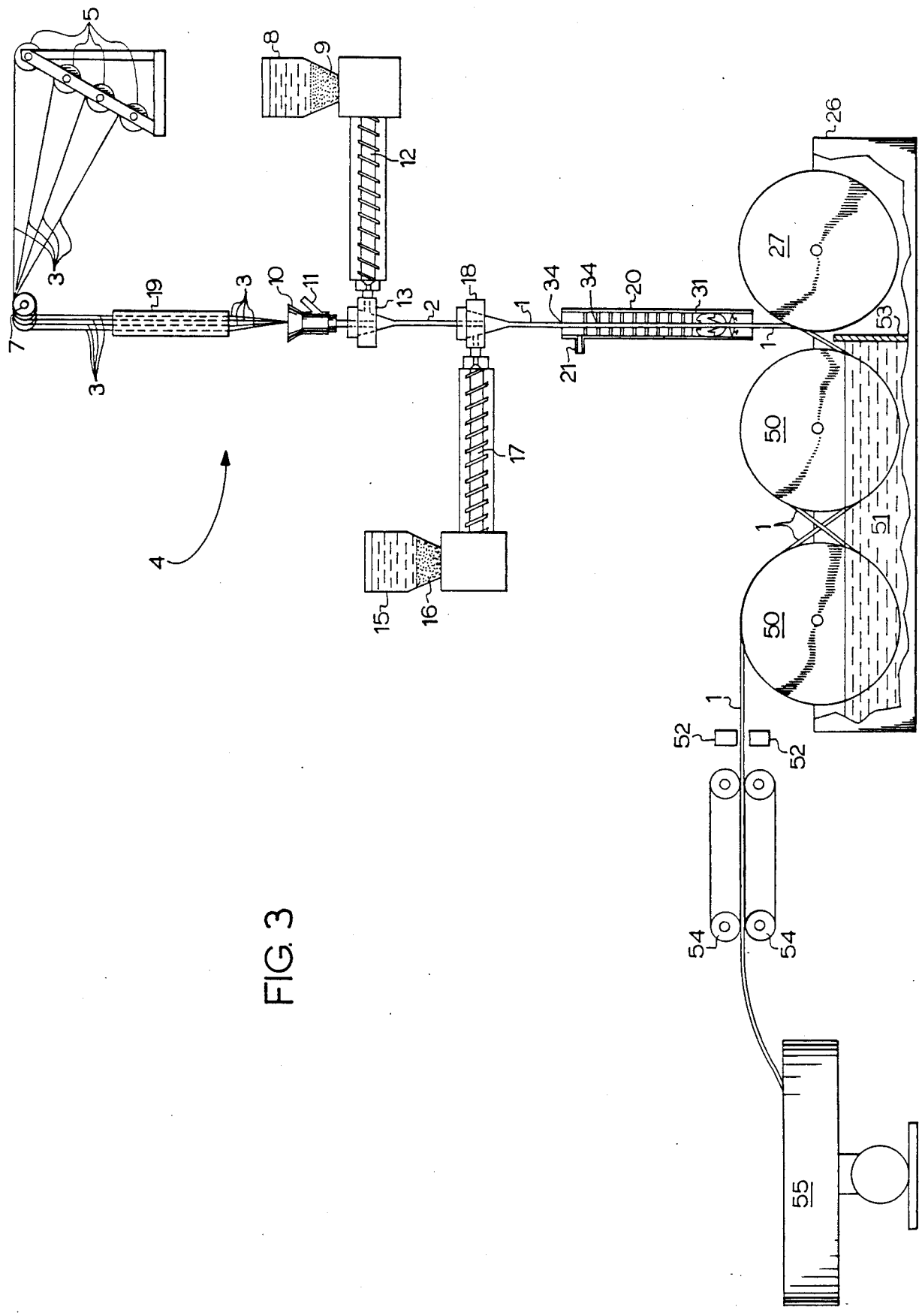
FIG. 3 is a schematic representation of apparatus used in the manufacture of the loose tube optical fiber of FIGS. 1 and 2 employing vertical extrusion according to the present invention.
Figure 4:
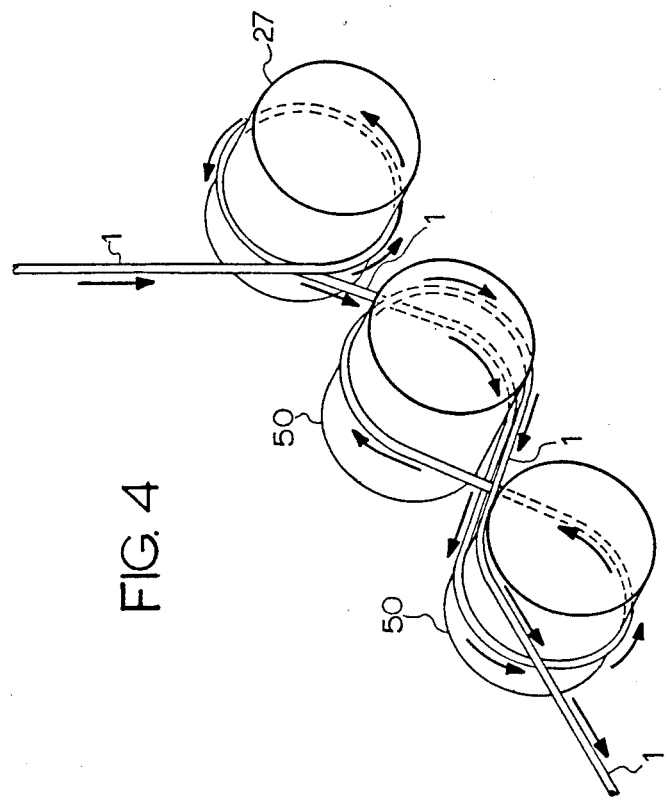
FIG. 4 is a perspective view of the route of travel of composite 1 of FIG. 3 after it leaves the cooling tower 20 and water block device 31 of FIG. 3.

Shown in FIG. 3 by element 4 is a schematic representation of the present invention, used to make loose tube buffered optical fiber. Optical fibers 3 on spools 5 are fed to pulley 7 thence to stranding device 19, where fibers are loosely twisted together. Stranded optical fibers 3 are fed to filling compound device 10. Filling compound (polybutene, parafin, or mineral oil and fumed silica for example) is fed through port 11 into filling compound device 10 and thence to optical fibers 3. Fibers 3 plus filling compound are then fed to extruder crosshead 13 where the first (inner) layer of buffer tube 2 is formed around fibers 3 and the filling compound. Plastic 9 (nylon for example) in hopper 8 is fed to screw 12 thence into crosshead 13 to accomplish the buffer tube 2 inner layer formation. This results in a composite of fibers 3, filling compound and buffer tube inner layer of tube wall 2. This composite is then fed to extruder crosshead 18. Plastic 16 (a suitable polyester for example) in hopper 15 is fed to screw 17 thence to crosshead 18 where the outer layer of tubewall 2 is formed. At this juncture the process has produced composite 1 comprising double layer buffer tube 2 circumscribing one or more optical fibers 3 (without the EFL) and a filling compound. Composite 1 is thence traversed, in a vertical manner, through cooling tower 20 composed of inlet water port 21, over a path of travel that is defined by apertures 34 of baffles 22 and inlet and outlet ports 19 and 47 of water block 31. Each baffle contains an aperture 34 aligned with the apertures in the other baffles and the inlet port 19 and outlet port 47 in the body of water block device 31 to define a buffer tube path of travel. After composite 1 is water cooled to a predetermined temperature (still without EFL), it emerges from water block device 31 essentially dry, at an elevated temperature and solidified to the extent that it can be traversed about a rotatable member without deformation. It is then traversed about sheave 27 disposed in catch basin 26 where the fibers 3 are forced to move to the inside wall of the tube and become coupled to the inner surface of inner layer of tube 2. Catch basin 26 normally contains no cooling water. Sometimes it is used to catch excess water from element 1 but only during start up, i.e., prior to blasting such water back into the chamber of water block device 31 employing a gas under pressure and holes 36. During operation, such blasting dries the buffer tube composite 1, prior to its being traversed around sheave 27, a rotatable member. Then composite 1 is traversed over two sheaves or rollers 50 in the manner shown in FIG. 4, which contains cooling water 51 and baffle 53 and cooled to ambient temperature. This is where the EFL is achieved. Coupling plus cooling from the elevated temperature of tube 2 as it emerges from water block 31 to essentially ambient temperatures causes the EFL. Subsequently composite 1 is monitored for diameter consistency by monitoring device 52 and is thence pulled by capstan 54 and placed (deposited) into take up tray 29. Cooling water is circulated into and out of cooling tower 20 and cooling tank 51 employing a prior art type closed chilling circuit (not shown). The temperatures of the chilling water is kept at a constant temperature.

Cooling tower 20 is necessary to cool to a predetermined temperature and thus solidify and give mechanical body to the outer tube of buffer tube 2 to the extent that it can be traversed around sheave 27 in catch basin 26 without deformation, where coupling takes place. EFL is achieved in cooling water 51. Absent cooling tower 20, plastic buffer tube 2 would be so deformable it would deform undesirably when it is traversed about sheave 27. With prior art apparatus, EFL's of $0 \pm 0.1\%$ with up to 3 mm diameter tubes can be achieved. Employing the device herein disclosed of FIG. 3, EFL's of 0.006% to 0.6976% with tubes of 4.5 mm have been achieved.

Figure 5:
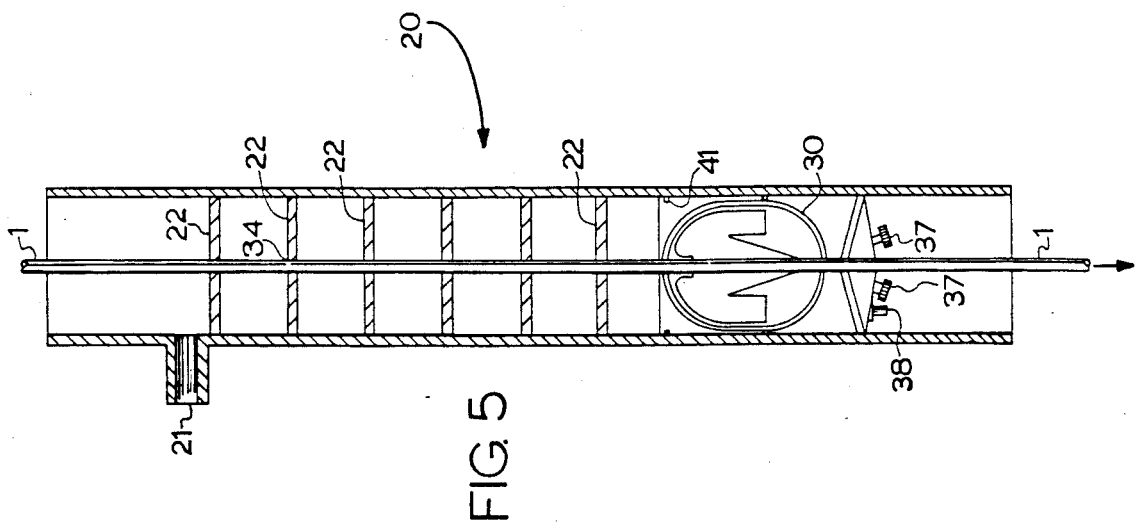
FIG. 5 is an enlarged cross-sectional view of the water tower cooling 20 and water block device 31 employed in FIG. 3.

FIG. 5 is an enlarged cross sectional view of the cooling tower 20 of FIG. 3, showing water block device 31 received in the lower portion of cooling tower 20. Cooling tower 20 has spaced apart baffles 22, each of which have apertures 34 aligned with one another and inlet 19 and outlet ports 47 respectively of water block device 31 to form a buffer tube path of travel along which composite 1 (absent EFL) travels from the top of cooling tower 20 to the bottom. Chilling water enters cooling tower 20 through port 21 and flows by gravity downwardly through apertures 34 until it comes in contact with water block device 31. "0" rings 41, see FIG. 6, form a water tight seal between the outer surface of water block device 31 and the inner surface of cooling tower 20, forcing all cooling water to flow into water block device 31 through inlet port 19. Once cooling water enters water blocking device 31, it either is entrapped in race or annulus shaped chamber 44 or attempts to flow out of conical shaped chamber 45 and outlet port 47. However, any chilling water deposited on composite 1 and/or attempting to escape or flow out of chamber 45 is prevented from doing so by air/gas under pressure emitting from holes 36 impinging upon the surface of tube 2 of composite 1. Elements 37 represent needle valves disposed in channels (not shown) communicating with holes 36. Element 38 represents a device to supply air or gas under pressure communicating by means of channels (not shown) with holes 36. External regulators (not shown) are employed to control the amount and velocity of air or gas supplied by element 38.

In operation, water block device controls the cooling of composite I while the tube 2 is not coupled to fiber(s) 3 (absent EFL). At the point composite 1 comes into contact with the air or gas streams emitted from holes 36, all cooling water is blasted upwardly into conical chamber 45 and thence into annular race 44 where it is collected. By means of channel 48, water collected in annulus race 44 portion is removed and recirculated in a prior art manner. Tube 2 of composite 1 emerging from the bottom of the water block 31 with fiber(s) 3 uncoupled to tube 2 and absent EFL, is essentially dry. As previously described, water block device 31 can be placed anywhere along the vertical axis of cooling tower 20, simply by removing or adding baffles 33 (as the case may be) and moving water blocking device 31 to a desired position. A water block device position in the upper reaches of cooling tower 20 increases EFL. Decreased EFL is achieved by lowering the position of water block device 31 along the vertical axis of cooling tower 21.

Figure 6:
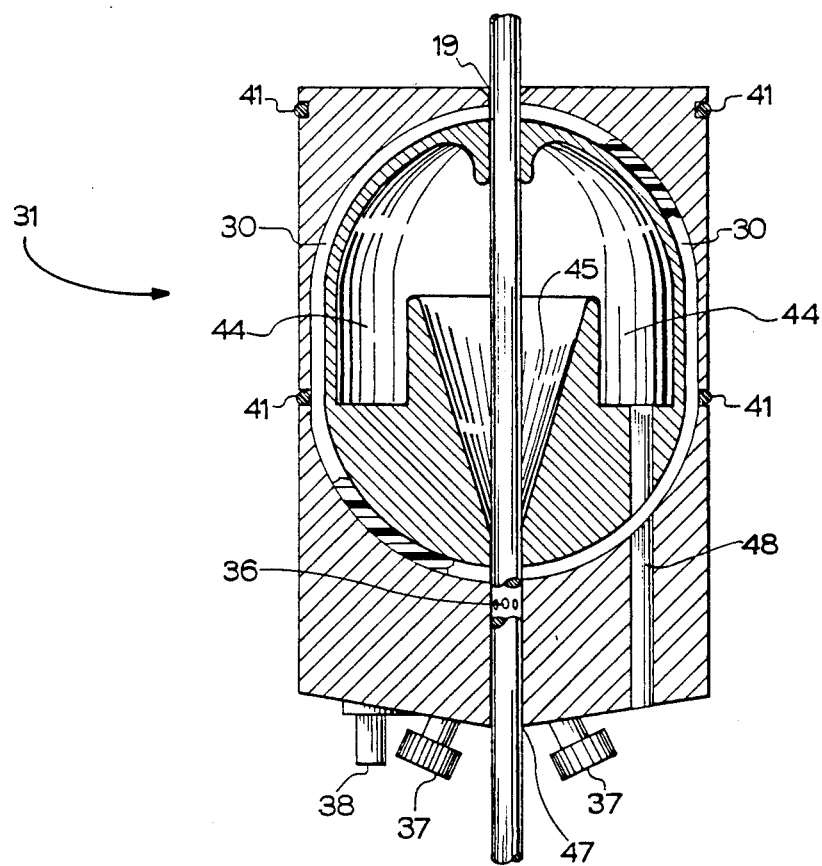
FIG. 6 is a cross-sectional enlarged view of the water block device 31 of FIGS. 3 and 5.
Figure 7:
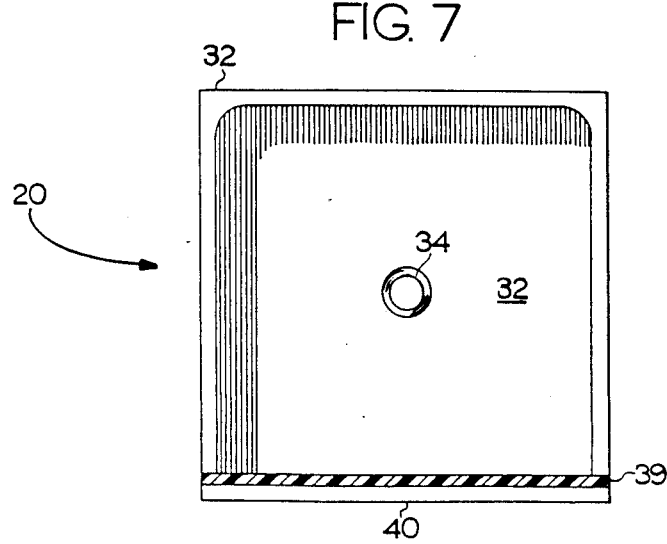
FIG. 7 is a plan view of the water cooling tower 20 of FIG. 5.

Water block device 31 comprises two parts, preferably made out of aluminum, plastic or steel. FIG. 6 is a cross section of element 31 showing only one half. A concave groove 30 is provided in each half and an "0" ring type gasket is disposed therein so as to provide a watertight joint between the two halves. FIG. 7 is a plan view of cooling tower 20 and is composed of "U" shaped member 32, seal 39, door 40 and baffles 32. Door 40 permits easy access to the interior of cooling tower 20. Seal 39 plus door 40 provides a water tight device.

What is claimed is:

1. A method of cooling an elongated member comprising:
   (a) providing an elongated tubular shaped member;
   (b) providing a water blocking device disposed in one portion of said tubular shaped member, said water blocking device having a body, said body having a chamber, inlet and outlet ports communicating with said chamber defining a path of travel, means for draining fluid from said chamber, and a means for directing gas against the path of travel;
   (c) traversing said elongated member along said path of travel while supplying a liquid to that portion of the tubular shaped member above the water blocking member;
   (d) directing a stream of gas against the surface of said elongated member and driving fluid thereon into said chamber;
   (e) removing from said chamber fluid collected therein; and,
   (f) removing the elongated member from said water blocking device and said tubular shaped member at a predetermined elevated temperature.

2. The method of claim 1 wherein said elongated member is a plastic tube in which there is disposed one or more optical fibers.

3. The method of claim 2 wherein said plastic tube contains a filling compound.

4. The method of claim 1 wherein said elongated tubular shaped member contains a plurality of spaced apart baffles, each of said spaced apart baffles containing an aperture through which a fluid and said elongated member may pass and said apertures are aligned with said path of travel.

5. The method of claim 2 further including the step of coupling said optical fibers to said plastic tube.

6. The method of claim 5 wherein said coupling is achieved by traversing said plastic tube containing one or more optical fibers around a first rotatable member.

7. The method claim 5 further including the step of creating excess optical fiber length in said plastic tube by cooling said plastic tube after said coupling takes place.

8. The method of claim 7 wherein said excess fiber length is achieved by cooling said plastic tube at the same time said plastic tube is traversed over one or more second rotatable members.

9. The method of claim 8 wherein said cooling to achieve said excess fiber length is achieved by a fluid.

* * * * *